UNITED STATES PATENT OFFICE 2,408,096

POLYHYDROXYAMINO COMPOUNDS

John S. Pierce, Richmond, Va., and John H. Wotiz, Pittsburgh, Pa.; said Wotiz, assignor to said Pierce No Drawing. Application May 1, 1944, Serial No. 533,644

5 Claims. (Cl. 260—584)

The present invention relates to new chemical compounds and to their methods of manufacture.

One object of this invention is to provide a means of holding bismuth in neutral solution, in high concentration. This is extremely important from a therapeutic standpoint.

Another object of this invention is to provide a means of holding iron salts in solution, particularly ferric salts in alkaline solution.

Another object is to hold in solution a high concentration of various metallic salts with a low concentration of the cation of the salt. Such a property has important industrial and pharmaceutical applications as is shown in the discussion of our invention.

Another object is to furnish intermediates for the dye industry, for detergents and for pharmaceuticals.

In general, our invention relates to polyhydroxy compounds containing two amino groups and four or more hydroxyl groups and to means of producing these compounds. More specifically, it relates to polyhydroxy amino alcohols made up of two groups, one containing an amino group and three hydroxyl groups and the other containing one or more hydroxyls, these groups being connected by linkage of amino nitrogens through carbon atoms.

One phase of this invention in which we are particularly interested is the class of compounds containing two tris(hydroxymethyl) methylamino groups, linked by alkylene or alkylene and hydroxylated methylene groups. A specific compound which may be used to illustrate our invention has the following structure:

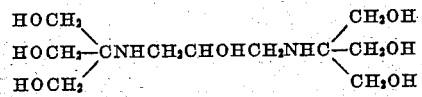

This compound, like all other compounds covered by this invention is extremely soluble in water and also forms very soluble salts, as the dihydrochloride. Due to its high solubility and to the hydroxyl groups and the secondary amino groups, this compound, like the other compounds covered by this invention, may be combined with other less soluble substances to form new products of intermediate solubility.

As illustrative of the methods used to prepare compounds covered by our invention, we give the following examples. It is understood that these examples are illustrative only and do not limit the invention in any way.

EXAMPLE 1

*1,3-bis[tris(hydroxymethyl) methylamino]-2-propanol dihydrochloride*

A mixture of 242 grams of tris(hydroxymethyl)-amino-methane (2.0 moles) and 92.5 grams of epichlorohydrin (1.0 mole) and 200 ml. of 95% alcohol was heated on a boiling water bath under reflux for 5 hours. The reaction mixture thus formed was treated with 100 ml. of concentrated hydrochloric acid, with stirring. A heavy precipitate was formed. The mixture was cooled and filtered with suction. The precipitate was recrystallized from an alcohol-water solution. There was obtained 190 grams (51% of theory) of 1,3-bis[tris(hydroxymethyl) methylamino]-2-propanol dihydrochloride, melting at 185–187°. On further purification, the product melted at 186–188°. Calculated for $C_{11}H_{28}O_7Cl_2N_2$: Cl, 19.13%. Found, 19.07%.

EXAMPLE 2

*1,3-bis[tris(hydroxymethyl) methylamino]-2-propanol dihydrochloride*

Glyceroldichlorohydrin was heated with two molar quantities of tris(hydroxymethyl) aminomethane at 100° for 3 hours with no solvent and with frequent stirring. The yellow glue thus formed was dissolved in hot alcohol and the solution was acidified with hydrochloric acid. The precipitate which formed on cooling was recrystallized from aqueous alcohol. (For constants, see Example 1.)

EXAMPLE 3

*1,3-bis[tris(hydroxymethyl) methylamino]-2-propanol*

The free base, 1,3-bis[tris(hydroxymethyl)-methylamino]-2-propanol, mixed with a little sodium chloride, was prepared by treatment of the dihydrochloride, in methyl alcohol, with the calculated quantity of sodium methylate, refluxing, cooling and filtering off the sodium chloride and evaporating to a syrup. Also, the free base was prepared for analysis from the dihydrochloride by prolonged heating with excess silver carbonate, removal of dissolved silver with hydrogen sulfide, and removal of colored impurities by repeated solution in absolute alcohol and treatment with anhydrous acetone. Finally, by evaporation of the oily lower layer, the free base was obtained as an oil. Calculated for $C_{11}H_{27}O_7N_2$: N, 9.40%. Found, 9.41%.

EXAMPLE 4
*1,2-bis[tris(hydroxymethyl)methylamino]ethane dihydrobromide*

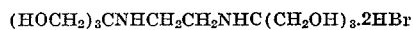

A mixture of 12 grams of tris(hydroxymethyl)-aminomethane and 20 ml. of freshly distilled ethylene bromide was heated in a round bottom flask equipped with an air condenser, on an oil bath at 180° for 4 hours. A light brown colored glue resulted. The excess ethylene bromide was removed by extraction with ether. The residue was purified by recrystallization from alcohol. The product, 1,2-bis[tris(hydroxymethyl)methylamino]ethane dihydrobromide, melted at 205–206°. Calculated for $C_{10}H_{26}O_6Br_2N_2$: Br, 37.16%. Found, 37.09%.

EXAMPLE 5
*1,3-bis [tris (hydroxymethyl) methylamino] propane dihydrobromide*

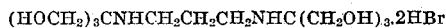

A solution of 24 grams of tris(hydroxymethyl)-aminomethane (0.2 mole) and 10 grams of trimethylene bromide (0.05 mole) in 150 ml. of alcohol was heated under reflux on a water bath for 6 hours. On standing over night, needle like crystals of $(HOCH_2)_3CNH_2.HBr$ were formed. These were filtered off and the filtrate was made distinctly acidic with hydrobromic acid. The acidic solution was evaporated to low volume to remove most of the water. The gummy residue was dissolved in hot absolute alcohol and treated with an equal volume of anhydrous acetone. Two layers were formed. The lower layer was separated and triturated with a mixture of equal volumes of absolute alcohol and anhydrous acetone, until crystalline. The solid, 1,3-bis[tris(hydroxymethyl)methylamino]propane dihydrobromide, on three recrystallizations from alcohol, melted at 170–171°. Calculated for $C_{11}H_{28}O_6Br_2N_2$: Br, 35.98%. Found, 35.25%.

EXAMPLE 6
*1,6-bis[tris(hydroxymethyl)methylamino]hexane dihydrobromide*

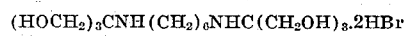

A mixture of 48.4 grams of tris(hydroxymethyl)aminomethane (0.4 mole) and 24.4 grams of hexamethylene bromide (0.1 mole) was refluxed with mechanical stirring until a homogeneous mixture was obtained. The brown glue thus formed was dissolved by refluxing with 300 ml. of 95% alcohol. The alcoholic solution was made strongly acidic with hydrobromic acid and most of the alcohol was evaporated off. The residue was treated with absolute alcohol and anhydrous acetone to yield crystals of impure $(HOCH_2)_3CNH_2.HBr$, melting at 128–132°. The filtrate was treated with three volumes of anhydrous acetone. An oily layer was formed. This lower layer was triturated with absolute alcohol and anhydrous acetone, yielding a solid melting at 150–155°. On recrystallization from 95% alcohol and anhydrous acetone, the product melted at 160.5–162°. Calculated for $C_{14}H_{34}O_6Br_2N_2$: Br, 32.87%. Found 32.10%.

EXAMPLE 7
*1-diethanolamino-3-tris (hydroxymethyl) methylamino-2-propanol dihydrochloride*

A mixture of 10.5 grams of diethanolamine (0.1 mole) and 9.3 grams of epichlorohydrin (0.1 mole) was stirred well, the temperature being kept around 30°. After the initial exothermic reaction ceased the mixture was left over night at room temperature. The clear viscous liquid was extracted with ether. The ether insoluble product was added to 12 grams of tris(hydroxymethyl)aminomethane (0.1 mole) and 50 ml. of ethyl alcohol and the mixture was heated under reflux on a water bath for 6 hours. The reaction mixture then was acidified with concentrated hydrochloric acid. An oil was thrown out by the addition of absolute alcohol, acetone and ether. This oil was converted to a semi-solid by solution in aqueous alcohol, treatment with anhydrous acetone and allowing the lower layer, after evaporation, to stand in a vacuum desiccator. Finally, purification was effected by extraction with hot absolute alcohol. Melting point, 139–141°. Calculated for $C_{11}H_{28}O_6Cl_2N_2$: Cl, 19.96%. Found, 19.55%.

EXAMPLE 8
*1 - ethylethanolamino - 3 - tris (hydroxymethyl) - methylamino-2-propanol dihydrochloride*

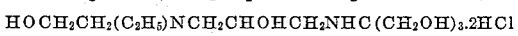

Ethylaminoethanol was reacted with an equimolar quantity of epichlorohydrin at a temperature below 30°. The condensation product thus formed was heated with an equimolar amount of tris(hydroxymethyl)aminomethane for 8 hours on a water bath and the mixture was acidified with hydrochloric acid. Repeated attempts to recrystallize from alcohol failed to yield a solid but the light pink colored glue analyzed fairly satisfactorily. Calculated for $C_{11}H_{28}O_5Cl_2N_2$: Cl, 20.90%. Found, 19.74%.

EXAMPLE 9
*γ,γ'-Bis[tris(hydroxymethyl)methylamino]-propyl ether dihydrochloride*

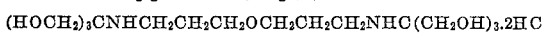

A mixture of 17 grams of γ,γ'-dichloropropyl ether (0.1 mole) and 24 grams of tris(hydroxymethyl)methylamine (0.2 mole) in 100 ml. of alcohol was heated over night at 110°. The alcoholic solution was acidified with hydrochloric acid and the precipitated tris(hydroxymethyl)methylamine hydrochloride was filtered off. Repeated evaporations, solution in absolute alcohol, treatments with anhydrous acetone and finally treatments with anhydrous ether were necessary to remove all of the unreacted amino alcohol hydrochloride. Finally, the product γ,γ'-bis[tris(hydroxymethyl)methylamino]-propyl ether hydrochloride was obtained as an oil, slightly impure. Calculated for $C_{14}H_{34}O_7Cl_2N_2$: chlorine 17.16%. Found 16.30%.

An attempt to prepare β,β'-bis [tris(hydroxymethyl)-methylamino]-ethyl ether dihydrochloride in a similar way from β,β'-dichloroethyl ether and tris(hydroxymethyl)-methylamine was unsuccessful but 4-tris(hydroxymethyl)methylmorpholine hydrochloride, melting at 184–185° was obtained. Calculated for $C_8H_{18}O_4ClN$: Cl, 15.57%. Found, 15.59%.

The compounds to which our invention relates possess certain novel properties respecting the solubilizing action on various cations, in alkaline solution.

As is well known, ferric hydroxide and some basic salts of the ferric ion are extremely insoluble. Aqueous solutions containing ferrous compounds, in contact with air or dissolved oxygen, readily form insoluble ferric compounds, even when the solutions are distinctly acidic and the rate of oxidation increases as the alkalinity increases. Thus the clogging of iron pipes with rust is a serious industrial problem. Certain polyhydroxy compounds, such as the sugars, tend to hold iron in solution in alkaline medium, but these sugars, due to their reactivity, decompose in alkali, particularly when warmed. Our polyhydroxyamines are much more stable toward alkali than are the sugars and alkaline solutions of these compounds have high solvent action on ferric hydroxide. For example, ferric hydroxide did not precipitate when alkali in excess was added to a solution approximately 0.1 molar in $Fe^{+++}$ and 0.5 molar in 1,2-bis[tris(hydroxymethyl)-methylamino] ethane. Also, under approximately the same conditions, 1,3-bis[tris(hydroxymethyl)methylamino] propane, 1,6-bis[tris(hydroxymethyl)methylamino] hexane, 1-tris(hydroxymethyl) methylamino-3-diethylamino-2-propanol and 1-tris(hydroxymethyl)methylamino-3-ethylethanolamino-2-propanol gave no precipitate of ferric hydroxide.

The above concentration of 0.1 molar $Fe^{+++}$ is not necessarily the limit of solubility, but is chosen arbitrarily to illustrate the solvent action of our amino alcohols on ferric hydroxide. In some cases much higher concentrations of $Fe^{+++}$ can be held in alkaline solution. For example, a solution 1 molar in $Fe^{+++}$ and in 1,3-bis[tris(hydroxymethyl)methylamino]-2-propanol gave no precipitate when treated with an equal volume of 10 molar sodium hydroxide. On being heated in a sealed Pyrex tube for 2 hours at 100° there was a slight silicious precipitate but none of ferric hydroxide.

In the solubilization tests described above and in the tests which immediately follow, the amino alcohols were used as salts, the dihydrochloride or dihydrobromide, and were treated with excess sodium hydroxide solution, to set free the amino alcohols.

Solubilization tests were run with each of the amino alcohols listed above and with each of the cations $Bi^{+++}$, $Mn^{++}$, $Ni^{++}$, $Co^{++}$, $Cd^{++}$ and $Cu^{++}$. The molar concentration of cation, amino alcohol and sodium hydroxide were respectively 0.1, 0.5 and 3.0. (Note: Actually, 4.0 molar quantities of sodium hydroxide were used, but 1.0 molar quantity was used up in setting free the amino alcohol from its salt.) In all cases, clear solutions or at most very slight precipitates were obtained.

As stated above, in the case of the solubilization of ferric hydroxide, the data given do not necessarily represent the limits of solubility, but are given to show that solubilization of certain cation hydroxides is a characteristic of the series of polyhydroxyamines covered by this patent application.

Table I gives values obtained with various cations, using 1,3-bis[tris(hydroxymethyl)methylamino]-2-propanol as solubilizing agent, with various concentrations of cation, amino alcohol and sodium hydroxide.

TABLE I

Cation solubilization with 1,3-bis tris(hydroxymethyl) methylamino-2-propanol

| Cation | Molar concentrations | | | |
|---|---|---|---|---|
| | Cation | Amino alcohol | Sodium hydroxide (and results)[1] | |
| $Fe^{+++}$ | 0.5 | 0.5 | 0.5+ | 2.5+ | 8.0± |
| $Bi^{+++}$ | 0.5 | 0.5 | [3]0.5− | 2.5+ | 8.0+ |
| $Ni^{++}$ | 0.5 | 0.5 | 0.5+ | 2.5+ | [4]8.0± |
| $Mn^{++}$ | 0.5 | 0.5 | [5]0.5± | [5]2.5+ | |
| | 0.25 | 0.5 | 0.5+ | 2.5+ | [2]8.0+ |
| $Co^{++}$ | 0.5 | 0.5 | 0.5+ | 2.5+ | 8.0+ |
| $Cu^{++}$ | 0.5 | 0.5 | [6]0.5− | | |
| | 0.25 | 0.5 | 0.5+ | | 8.0+ |
| $Cd^{++}$ | 0.5 | 0.5 | 0.5+ | 2.5+ | [7]8.0± |

[1] Failure to precipitate after approximately two hours is indicated by "+". Immediate precipitation is indicated by "−" and "±" is used to indicate initial solubilization but the formation of a precipitate within two hours, usually within a few minutes.
[2] Precipitates within a few minutes.
[3] The precipitate at this point may be partly due to some hydrochloride of the amino alcohol, present as an impurity.
[4] Cloudiness, initially. Increased precipitate, on standing.
[5] If air is present, a wine color starts to form almost as soon as the amino alcohol and $Mn^{++}$ are mixed. When the air was displaced by Pyrofax gas, a clear solution was obtained which gradually became wine colored and finally purple. Also, a precipitate formed fairly readily, particularly in the solution containing excess alkali.
[6] Bluish colored precipitate in deep blue solution.
[7] Precipitate, on standing.

Since all of the polyhydroxyamines listed above proved to have solubilizing action on certain cations, in alkaline solution, several more derivatives of tris(hydroxymethyl) aminomethane were synthesized and tested as solubilizing agents. 1,6-bis[tris(hydroxymethyl) methylamino]-2,3,4,5-tetrahydroxyhexane $(HOCH_2)_3CNHCH_2(CHOH)_4CH_2NHC(CH_2OH)_3$ formed (as the dihydrobromide) by heating mannitol dibromide with slightly over four molar quantities of tris(hydroxymethyl) aminomethane in alcohol solution in a sealed tube at 138° for 15 hours, had a solubilizing action on $Fe^{+++}$, $Bi^{+++}$, $Mn^{++}$, $Ni^{++}$, $Co^{++}$, $Cu^{++}$ and $Cd^{++}$, when the molar concentration of cation, amino alcohol and sodium hydroxide were respectively 0.1, 0.25 and 3.5. This is not necessarily the limit of the solubilizing power of the amino alcohol for $Fe(OH)_3$ did not precipitate when $Fe^{+++}$, the above amino alcohol and excess sodium hydroxide were mixed in molar concentrations of 0.33, 0.25 and 3.5 respectively.

Many useful applications of our novel solubilizing agents will occur to those skilled in the various arts. Illustrative examples of a few uses are given.

The ability of the amino alcohols to hold ferric hydroxide in solution, as illustrated particularly with 1,3-bis[tris(hydroxymethyl) methylamino]-2-propanol, should find many important industrial applications. One particularly useful application is in cleaning out boiler tubes. Not only does the above amino alcohol have a tendency to hold ferric hydroxide in solution but a hot alkaline solution of it slowly loosens rust. In a boiler tube, the loosening of rust so that it may be blown out of the tube, is almost as much value as its dissolution.

Another useful application may be in the treatment of syphilis. A solution of bismuth containing approximately 60 mg. of bismuth per ml. was prepared by warming freshly precipitated bismuth hydroxide with a solution which was approximately 0.8 molar in 1,3-bis[tris(hydroxymethyl)methylamino]-2-propanol and in sodium hydroxide and by neutralizing with tartaric acid to approximately a pH of 7.4 This solution was found to be stable to heat in a sealed tube at 125° for 30 minutes.

The compounds to which our invention relates have properties which indicate their usefulness in calcium therapy for in the therapeutic use of calcium it is desired to have a moderately low concentration of Ca++ but to have a relatively high concentration of combined calcium in a form in which it can be utilized by the body. Calcium gluconate is likely the most generally used form of calcium for intravenous injection and it also is used extensively for oral administration. It usually is given in 10 per cent solution intravenously or intramuscularly. Since calcium gluconate contains approximately 9 per cent of calcium, this corresponds to a content of approximately 10 mg. of calcium per ml. of solution.

In preparing calcium for therapeutic use we employed the following procedure: Freshly precipitated calcium hydroxide was warmed with an equimolar quantity of 1,3-bis[tris(hydroxymethyl)methylamino]-2-propanol dihydrochloride in approximately 30 per cent solution. The aqueous solution was filtered from a slight residue and evaporated to a syrup. On neutralization to physiological pH (7.4) with hydrochloric acid a clear solution was obtained with a relatively low concentration of Ca++ and a total concentration of approximately 40 mg. of calcium per ml. Acetic acid also was used to neutralize the basic solution containing calcium. A solution can be made by the methods just described appreciably more concentrated than 40 mg. of Ca per ml.

A further use for which our compounds are adapted is in the art of electroplating. As is well known, elements high in the electromotive series readily replace from solution the elements lower in the series. Thus, iron displaces copper readily and when it is desired to plate copper on iron, it is customary to use a bath containing potassium cyanide to lower the concentration of the copper ion in solution. The toxicity of the cyanide solution makes it desirable to use a substitute. In alkaline solutions of our polyhydroxyamines, the concentration of Cu++ is extremely low. As illustrative of this low concentration and of an important industrial application of these polyhydroxyamines, we give the following example:

A solution containing 25 grams of $CuSO_4.5H_2O$, 74.2 grams of 1,3-bis[tris(hydroxymethyl)methylamino]-2-propanol dihydrochloride and 20 grams of sodium hydroxide per liter, did not deposit free copper on a clean strip of iron metal immersed in it. However, when an electric current, with a voltage of 1.6 and a current density of 0.14 ampere per sq. dec. was passed through the solution, with the iron strip as cathode, an adherent coating of copper was deposited on the iron.

The ability of the polyhydroxyamines not only to hold the copper in solution but also to prevent the precipitation of copper on iron and to hold iron and various other cations in solution should prove of great value in copper plating. The ability of our amino alcohols to hold a low concentration of various other cations should likewise prove of value in electroplating with other metals.

The temperatures reported in this application are all on the centigrade scale.

In our work with the polyhydroxyamine salts, some of the products remained as oils for a long time and were crystallized with great difficulty. It is quite likely that some of the products which we reported as oils eventually may be crystallized to yield fairly high melting solids. The constants reported are those obtained by careful experimentation but since slight traces of impurities frequently prevent the crystallization of a substance or lower the melting point of a solid appreciably, we do not limit our claims to substances with the exact physical properties reported.

We claim:

1. New compounds of the structure $(HOCH_2)_3CNHCH_2(CHX)_zCH_2NHC(CH_2OH)_3$ where X is taken from the group H and OH and z represents a number from zero to four, inclusive.

2. Salts of the compounds in claim 1.

3. A new compound of the structure $(HOCH_2)_3CNHCH_2CHOHCH_2NHC(CH_2OH)_3$

4. Salts of the compound of claim 3.

5. The dihydrochloride of the compound of claim 3.

JOHN S. PIERCE.
JOHN H. WOTIZ.